(12) United States Patent
Graber

(10) Patent No.: US 8,125,715 B1
(45) Date of Patent: Feb. 28, 2012

(54) ADJUSTABLE ELECTROMAGNETIC ENERGY COLLIMATOR

(76) Inventor: Curtis E. Graber, Woodburn, IN (US)

( * ) Notice: Subject to any disclaimer, the term of this patent is extended or adjusted under 35 U.S.C. 154(b) by 345 days.

(21) Appl. No.: 12/006,482

(22) Filed: Jan. 3, 2008

Related U.S. Application Data

(60) Provisional application No. 60/878,719, filed on Jan. 5, 2007.

(51) Int. Cl.
*G02B 27/10* (2006.01)
(52) U.S. Cl. ........................................................ 359/618
(58) Field of Classification Search .................. 359/618
See application file for complete search history.

(56) References Cited

U.S. PATENT DOCUMENTS

| | | | |
|---|---|---|---|
| 3,034,436 A * | 5/1962 | Arthaber et al. .............. 102/213 |
| 4,241,389 A | 12/1980 | Heimer | |
| 4,421,200 A | 12/1983 | Ferralli et al. | |
| 5,483,430 A | 1/1996 | Stapel et al. | |
| 5,684,626 A * | 11/1997 | Greenberg .................... 359/388 |
| 6,024,473 A | 2/2000 | Fadel | |
| 6,231,198 B1 | 5/2001 | Foo | |
| 6,402,325 B1 | 6/2002 | Yamamoto | |
| 2004/0051982 A1 * | 3/2004 | Perchak ....................... 359/831 |
| 2006/0109556 A1 * | 5/2006 | Guldevall .................... 359/631 |

FOREIGN PATENT DOCUMENTS

| | | |
|---|---|---|
| EP | 1 826 474 A1 | 8/2007 |
| JP | 2000287108 A * | 10/2000 |

* cited by examiner

*Primary Examiner* — Ricky Mack
*Assistant Examiner* — James Greece
(74) *Attorney, Agent, or Firm* — Paul W. O'Malley; Susan L. Firestone

(57) ABSTRACT

An EM energy projector incorporates a final stage radiator including a shaped reflecting spike having a forward radiant axis. The shaped spike defines a set of equivalent, discrete input locations, there being a plurality of such locations. The emitters are arranged in a closed line array, and disposed with all of the emitters oriented inwardly toward the forward radiant axis.

9 Claims, 9 Drawing Sheets

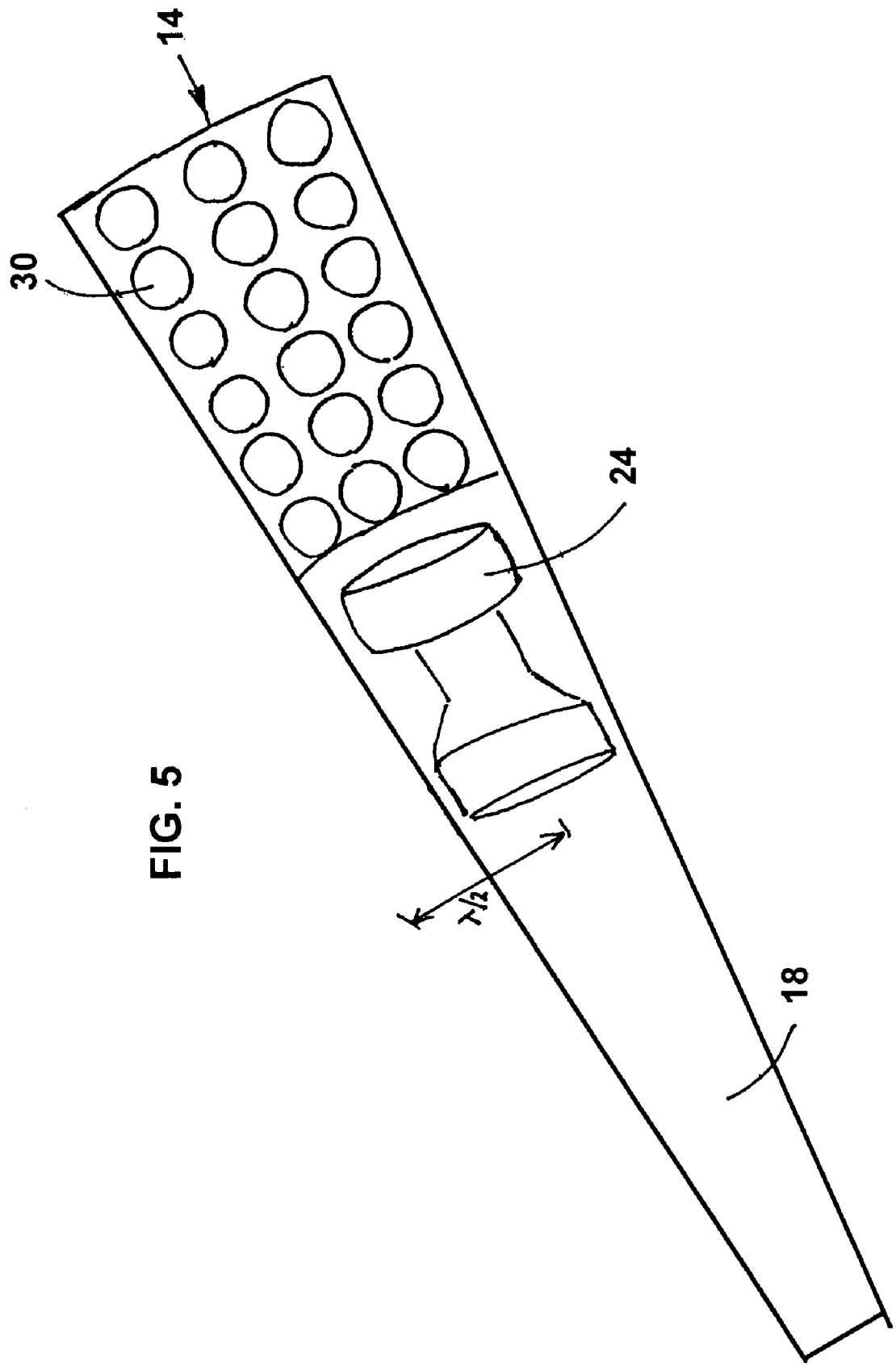

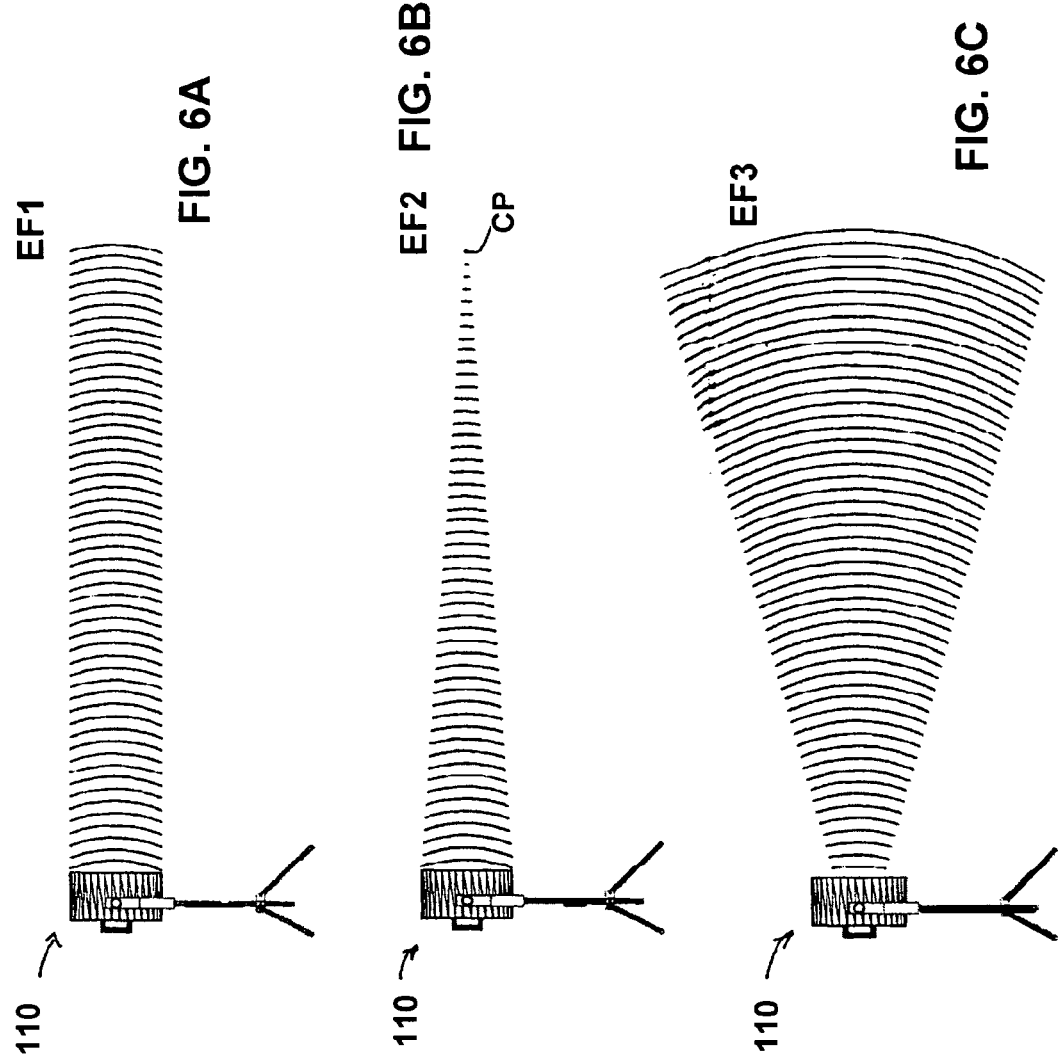

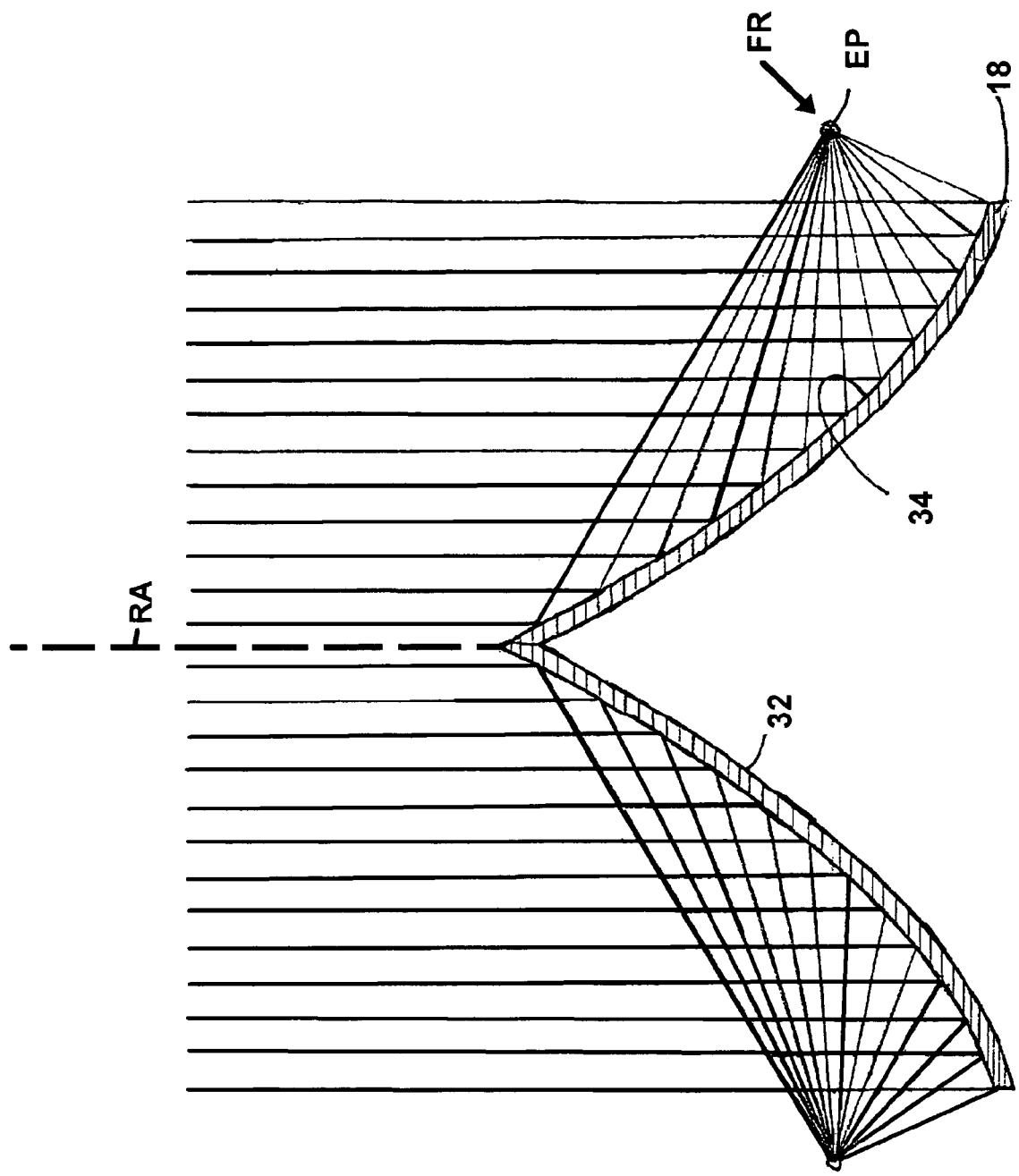

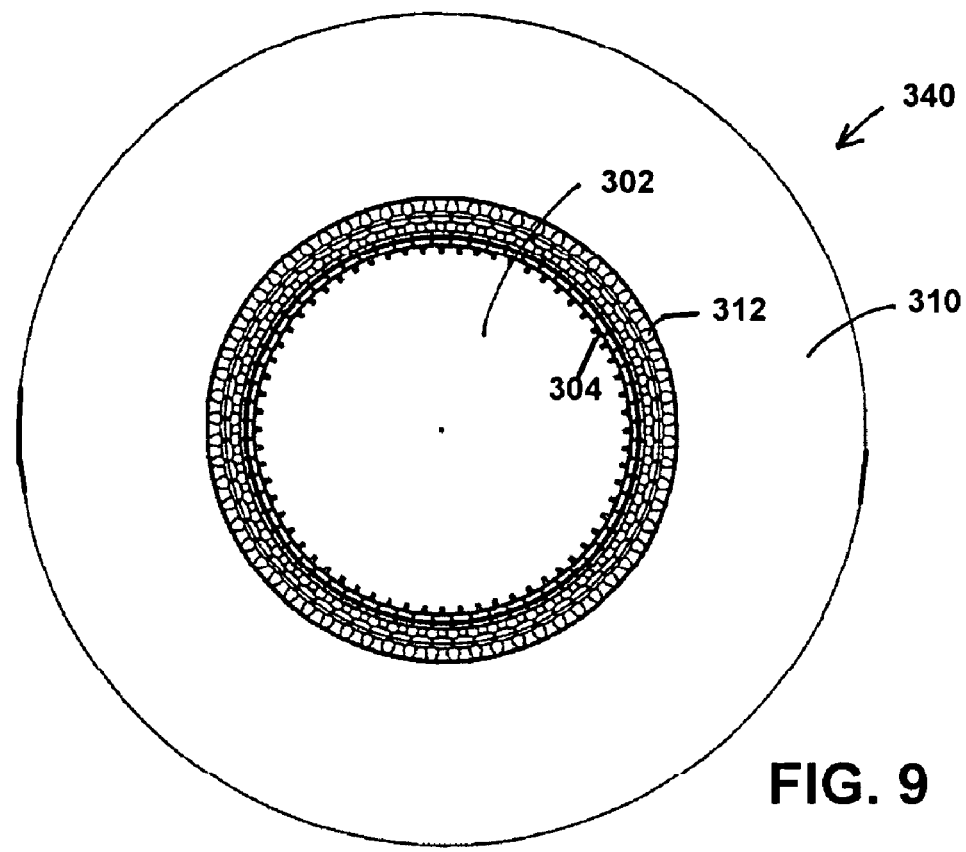
FIG. 9
FIG. 10
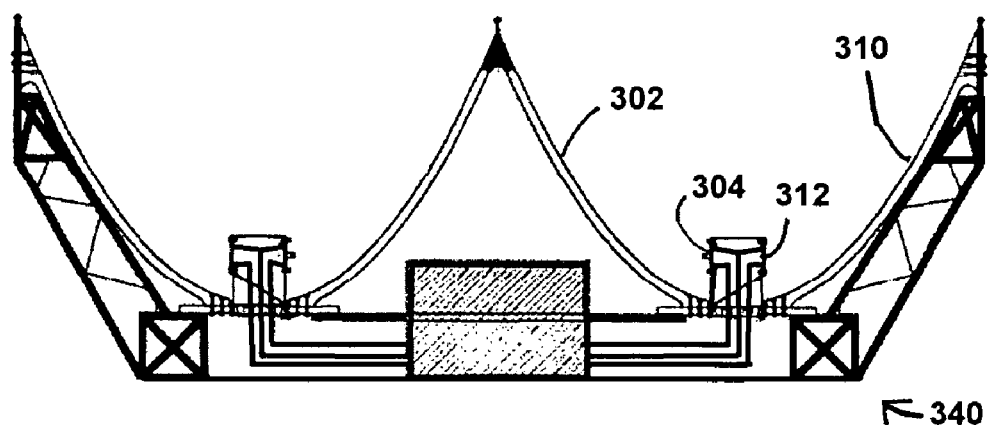

ADJUSTABLE ELECTROMAGNETIC ENERGY COLLIMATOR

This application claims the benefit of U.S. Provisional Application No. 60/878,719 filed Jan. 5, 2007.

BACKGROUND OF THE INVENTION

1. Technical Field

The invention relates to an electromagnetic (EM) energy projection system and more particularly to an energy collimator efficiently combining inputs from a plurality of sources with a minimum of destructive interference and projecting an energy field having a clean conic, or cylindrical, shape of high radiant power.

2. Description of the Problem

Obtaining high efficiency in the projection of radiated power or achieving high power levels in a projected beam, using transmitters of a given, limited output capacity, have been obtainable through various techniques, but doing both concurrently has proven more difficult. High efficiency can be obtained by use of a focusing reflector, such as a parabolic dish, to produce a narrow beam. However, such systems are usually inherently limited to a single input point which limits them to the use of only one transmitter. High power levels can be obtained at some loss of efficiency where the radiation fields exhibit high levels of spatial coherence. This is done with the use of phase arrays constructed from mutually coherent sources. These arrays can incorporate hundreds, or even thousands, of transmitters and can be used to produce powerful, steerable beams while suppressing side lobes. The power cost is substantial and the return from additional transmitters diminishes with expansion of the array. Arrays are effective only when the transmitters are spaced from adjacent transmitters in the array by less than one half of a wavelength of the emitted radiation, which makes them useful at radio frequencies (RF) but makes them impractical at optical frequencies (OF).

Weather radar systems provide one useful application of electromagnetic radiation projection where high power inputs are useful and the use of phase array systems widespread. In general, weather radar operates over an EM wavelength between one and 30 centimeters (i.e. microwave RF with shorter wavelengths required for smaller particle detection, such as clouds), generates pulses with a peak power of several megawatts, pulse widths of a few microseconds, a pulse repetition rate of several hundred hertz or less with a relatively narrow beam resulting from using arrays of hundreds of transmitters.

Each antenna in the linear or planar phase array is provided with its own phase shifter to produce patterns of constructive and destructive interference based on slight variations in the phase relationship of the outputs of the transmitters. The constructive interference produces a narrow, steerable beam (through phase shifting or frequency scanning) of high power. Destructive interference minimizes side lobes, though they remain present which contributes to return clutter. Each emitter in an array may be an inexpensive, low performance component, reducing cost of the system. Such arrays are almost infinitely scalable to achieve any power output desired, though at the price of diminishing returns. And such scalability comes at the cost of bulkiness. It can also be difficult to mount such a system on an aircraft due to the physical dimensions of the system. The ability to achieve the higher power outputs of multiple transmitters by coherently summing the outputs of multiple transmitters would be of great value.

In optical applications where coherence is not readily obtainable, an arc discharge lamp positioned at the focus of a parabolic reflector has been used has been favored for obtaining high intensity light beams. The ability to use a plurality of transmitters of a given, limited output capacity operating at high efficiencies, would allow the displacement of such a high maintenance cost light source.

Achieving phase coherence among distinct transmitters at optical frequencies is much more difficult and practical implementations of phase arrays at optical frequencies are not common. However, if outputs can be summed without considering coherence numerous methods exist for adding outputs from numerous sources. However, the techniques of the invention described here are not believed to have been previously applied at optical frequencies.

SUMMARY OF THE INVENTION

The invention provides an electromagnetic energy projector or collimator which sums the signals from a potentially large plurality of low power emitters to produce a high power beam. Used with sources of mutually coherent radiation the invention reduces the losses associated with destructive interference between the signals from the different emitters. For higher frequency radiation, focusing and filtering techniques applied by the invention provide incident beam shaping into the final stage radiator to minimize energy waste.

The collimator of the invention includes a final stage radiator. In its preferred form for radio frequency applications, the final stage radiator is a cone reflector having a forward radiant axis. The cone reflector defines a non-trivial set of equivalent input locations surrounding the cone reflector which is level with and slightly forward from its base and centered on the forward radiant axis. This set of locations is termed the focal ring of the projector. EM energy sources are used as inputs to the projector and are located on the focal ring.

At radio frequencies the emitter sources may be closely enough spaced relative to the radiated wavelength to function as a distributed, but continuous, source. The energy sources are, in effect, an inwardly oriented, curved "linear" or "phase" array, set in a closed loop. Interference between the sources in the array suppresses side lobes radially, tending to confine energy from the sources to a single lobe intersecting the cone reflector, which is aligned on the forward radiant axis. No further destructive interference occurs upon collection and collimation of the resulting beam. In effect, the system may be considered as exhibiting destructive interference in only a single axis, not in two axes as occurs in a planar array of emitters. This results in more radiated power per unit of input power. The reflector provides nearly as tight a beam as a parabolic dish, but allows an essentially unlimited number of input sources and eliminates any clutter or shadow effect produced by a support for an emitter centered above the dish as is commonly provided in parabolic dish systems.

At high microwave and optical frequencies the electromagnetic beams emitted by the sources are spatially filtered and focused to produce a blade tapered to intersect the final stage radiator with little loss of radiation. In effect the radial suppression effects of a linear array are emulated and the same geometric result obtained. It is not strictly necessary for the loop of emitters to be a closed loop, particularly if the emitted beam is to have a cross sectional shape of other than a circle.

The conical reflector is preferably a forward oriented spike, with cross-sectional profiles in planes including the radiant axis which are parabolic in shape. The conical reflector as a whole can be considered to be hyperbolic because it does not have a single focal point. Ideally, if apparent points of origin of the energy directed against the conical reflector are located on the focal ring, the radiation would be reflected forward from the conical reflector as a beam. In practice of course the beam is subject to some spreading. Movement of the source points back and forth parallel to the radiant axis can be done to produce a diverging beam or a converging beam. Where the system is incorporated into a radar system receiving antennas may be located in an annular array on the focal ring around the conical reflector.

In other embodiments the final stage radiator/projector may include inner or outer reflecting surfaces. The inner reflecting surface is formed from a cone reflector having its axis aligned on an intended radiant axis as already defined. An outer reflecting surface, if present, is a forward concave annular ring disposed around the cone reflector. Preferably the shapes of the reflecting surfaces are parabolic relative to the forward radiant axis and define an inner surface focal ring and an outer surface focal ring. A plurality of transducers is placed along each focal ring with the individual transducers turned into the reflecting surfaces. The transducers are arrayed with spacing between the transducers chosen by reference to the highest intended operating frequency of the device.

In a minimal configuration for optical or short microwave applications, the invention provides an EM radiation collimator in which the radiation sources are positioned at discrete locations located along an arc, or more typically a full ring, around the base of reflecting cone/spike pointed in the direction of the forward or projection axis of the device. Collimation of the radiation requires two stages for optimal effectiveness, a primary stage associated with source output collection and beam shaping and a final stage radiator embodied in the reflecting cone.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a partial section of the energy projector and associated echo return antenna array.

FIGS. 6A-C are schematic illustrations of variation in energy beam divergence.

FIG. 7 is a schematic illustrating operation of the final stage radiator.

FIG. 9 is a front plan view of a collimator incorporating inner and outer final stage reflectors.

FIG. 10 is a cross sectional view of the collimator of FIG. 9.

DETAILED DESCRIPTION OF THE INVENTION

Figure 1:
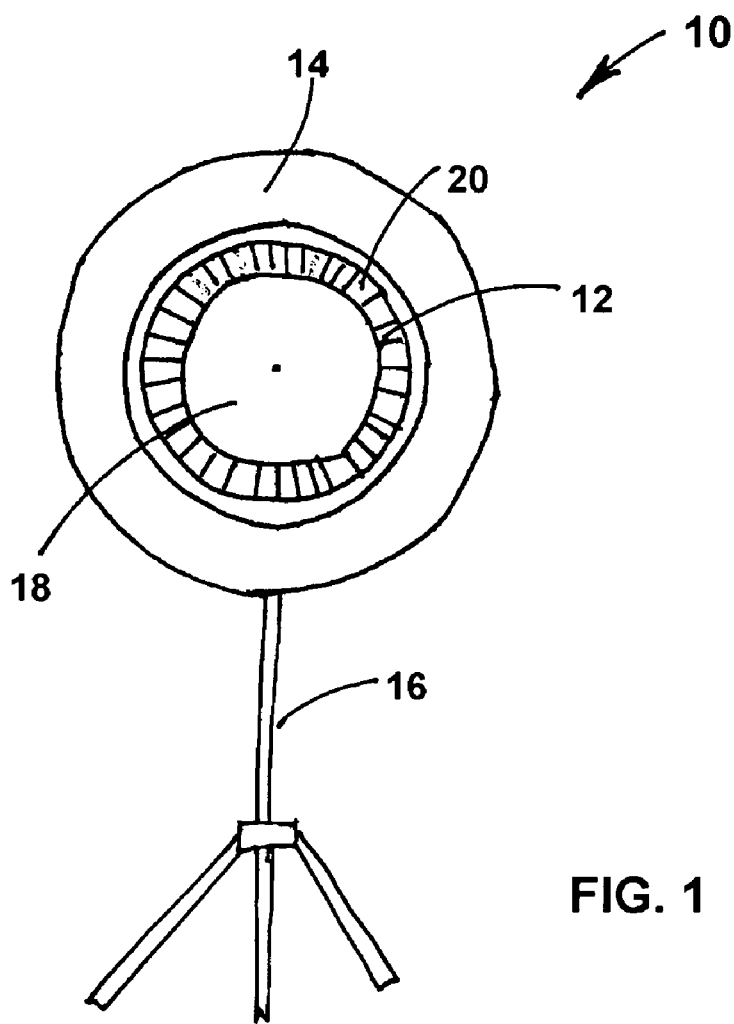
FIG. 1 is a front elevation of an energy projector based on an interior cone reflector.
Figure 2:
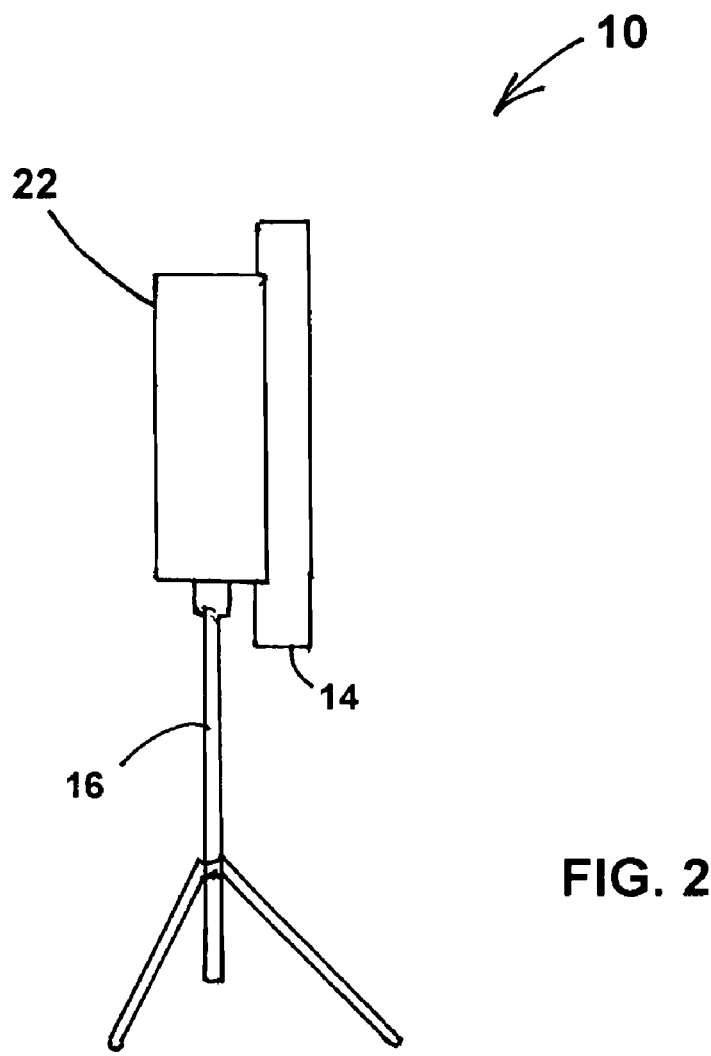
FIG. 2 is a side elevation of the energy projector.

Referring to the Figures and in particular to FIGS. 1 and 2, a first embodiment of the invention is illustrated. A portable radar system 10 incorporates an energy collimator 12 centered behind an annular array 14 of receiving antennas. The portable radar system is supported on a tripod 16. Energy collimator 12 incorporates a conical reflector 18 centered within the annular opening in annular receiver array 14. Energy collimator 12 is mounted in a shallow cylindrical shell 20 which supports the annular array 14 and which is open in the direction of projection of electromagnetic radiation. The system is preferably mounted on an altazimuth mount allowing the energy collimator 12 to be pointed in any direction or positioned by a controller as required for tracking or scanning. Using an annular receiver array 14 as depicted is exemplary only. Where possible (especially in lower frequency devices), the receiving antennae may be located interspersed with the transmitting horns.

Figure 3:
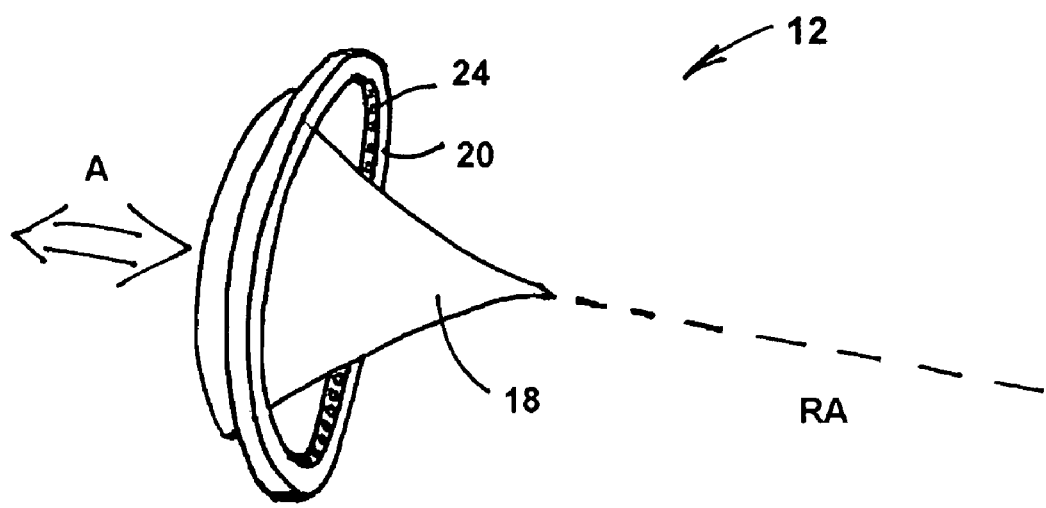
FIG. 3 is a perspective view of the arrangement of the primary and final stage radiators of the energy projector of the invention.

Energy collimator 12 is illustrated more particularly in FIG. 3. Energy collimator 12 is based on a conical reflector 18, which is essentially a spike pointed in the direction of energy projection. Conical reflector 18 is preferably a hyperbolic form conforming to a parabola rotated around the energy projection axis RA. The surface of conical reflector 18 is reflective to the wavelength(s) of electromagnetic radiation of interest in a particular application. The surface cannot be "diffusive" at the wavelengths of interest (typically 1 cm to 30 cm, i.e. microwave radiation). At optical frequencies the surface would be mirror like.

An example for a location of the annular transducer array section 18 is illustrated by reference to FIG. 3, which shows a cone reflector 14 which is shaped so that sections of the cone reflector, taken in planes including the radiant axis RA, are hyperbolic sections providing a hyperbolic reflective surface 22 with a focal ring FR. The focal ring FR preferably lies in a plane perpendicular to the radiant axis, is circular with a non-zero circumference centered on the radiant axis RA and lies somewhat above the base of the cone reflector 14 so that it circles the cone reflector. It is conceivable that an oddly shaped reflector could be produced which would define a focal ring with an odd or uneven geometry. Doing so would greatly complicate locating a curved line phase array of transducers at RF frequencies, but may be practical for an array of optical emitters which do not depend upon destructive interference to shape the incident radiation field directed against the reflector. An array of transducers is located on the focal ring of the cone reflector 14 and oriented to direct electromagnetic energy against the cone reflector.

In some embodiments the receiving antennae may be located interspersed among the transmitters on the focal ring FR. By arranging the transducers in a circle, with the spacing between the transducers being no more than one half of the wavelength of the emitted radiation, an inwardly curved phase array is provided which, if the emitted radiation is coherent, produces a compressed disk of radiation and directs it against the cone reflector 14 for forward reflection. If the array of transducers is located on a focal ring for the cone reflector, the radiation generated by the transducers is reflected forward along the radiant axis in a highly collimated forward electro-magnetic field exhibiting little dispersion. If the transducers are moved forward and backward in parallel with the radiant axis RA (as indicated by double headed arrow A and illustrated in FIG. 4), the field can be made more dispersive, or given a far field convergence point forward from cone reflector 14 (as shown in FIG. 6).

Figure 4:
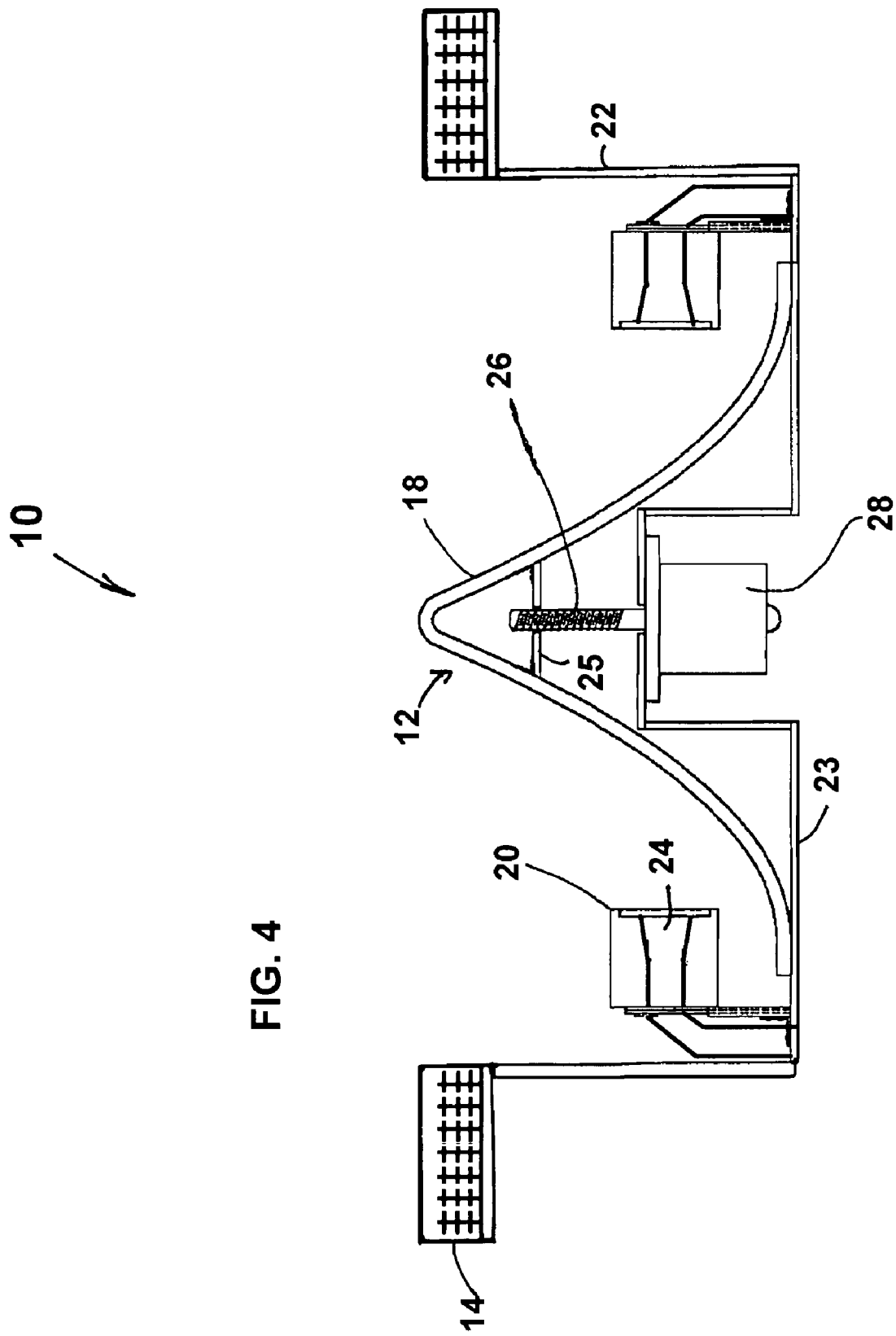
FIG. 4 is a cross sectional view of the energy projector and associated echo location return antenna array, with a positioning mechanism for varying the divergence of the projected beam.

FIG. 4 is a cross sectional view of a portable radar unit 10 incorporating an electro-magnetic energy collimator 12. Elements of the energy collimator 12 are variably positionable along the radiant axis of the collimator. In the preferred embodiment this is implemented by making conical reflector 18 displaceable within cylindrical shell 22, or to put it more clearly, movable along the radiant axis. To effect the relative placement of conical reflector 18 respecting cylindrical shell 22, and thereby change the displacement of the ring array 20 of emitters (microwave horns 24) from the focal ring of the reflector, a motor 28 is mounted to the back face 23 of the cylindrical shell 22. Motor 28 has an extended threaded shaft 26 (which may be substantially geared down from the motor) which extends along the central axis of the conical reflector 18 and engages a threaded bore in a back plate 25, which is an integral part of the support frame of conical reflector 18. Rotation of the threaded shaft 26 moves conical reflector 18 along its central axis, which lies along the radiant axis of the collimator 12. The direction of rotation of the shaft 26 obviously determines the direction of movement of the conical reflector. The relative positions of conical reflector 18 and ring array 20 determine whether the emitted energy beam is divergent, convergent or fully collimated, as desired. It is of course obvious that the ring array 20 may be made movable rather than the collimator 12.

FIG. 5 is a view of a wedge section of collimator 12 and an arc from the annular array 14 disposed around the emission side of the collimator. Annular array 14 is illustrated as having six concentric rings of antennae 30, with antennae radially aligned from ring to ring. Inward from the annular array 14 is a microwave horn 24 oriented to direct EM energy inwardly toward the center of the conical reflector 18. Adjacent horns 24 have emission points which are preferably spaced no more than one half the wavelength of the smallest wavelength of radiation used for the coherent system illustrated. Thus dispersion of radiation from any given emitter is limited and most of the energy is incident with the spike/collimator 12.

FIGS. 6A-C illustrate the divergence (EF3), convergence (EF2) to a convergence point (CP), or collimation (EF1) of an projected energy field achieved by a standalone projector 110. FIG. 7 illustrates collimated reflection of incident radiation emitted from emission points (EP) along the focal ring (FR). The sections 32 of conical reflector 18 are fully parabolic in the example. The reflective surface 34 is sufficiently smooth, or polished if so required, to be non-diffusive at the wavelength in use.

Figure 8:
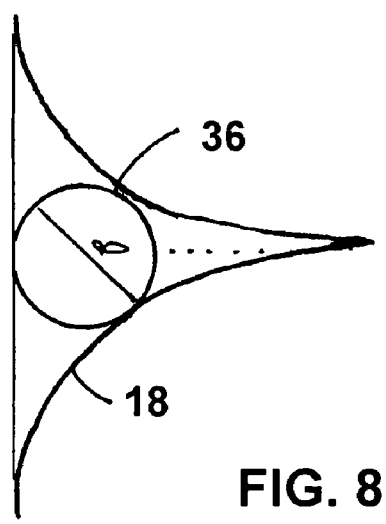
FIG. 8 is a cross sectional illustration of a conical reflector illustrating a method of providing a dimensionally optimized reflector.

FIG. 8 illustrates optimized dimensions for a conical reflector 18 having parabolic sections to achieve the optimized reflection as illustrated in FIG. 7. A hypothetical circle 36 is circumscribed by the sides and base of a cross section of the reflector 18 so that the circle is tangent to the sides and base. At a wavelength of incident radiation equal to the diameter d of the circle 36 about 70% of the radiation is reflected forward. At a wavelength of incident radiation equal to one half the diameter of the circle about 85% of incident radiation is reflected. When the diameter of the circle exceeds 4 times the wavelength enough incident radiation is reflected forward to make further expansion of the reflector 18 so subject to diminishing returns as to make further enlargement impractical.

FIGS. 9 and 10 illustrate a collimator 340 having an inner spike/cone reflector 302 located coaxially with a outer annular reflector 310. Inner and outer arrays of emitters 304 and 312 are disposed in circles between the inner and outer reflectors 302, 310, oriented inwardly and outwardly respectively. While the outer array 312 of emitters is characterized by spacing between emitters of less than one half wavelength, it may be seen that operation as a line source in order to obtain full reflection does not require annular compression of the output in order to avoid spill over radiation which misses a tapering reflector, as is the case with the inner spike 302.

Figure 11:
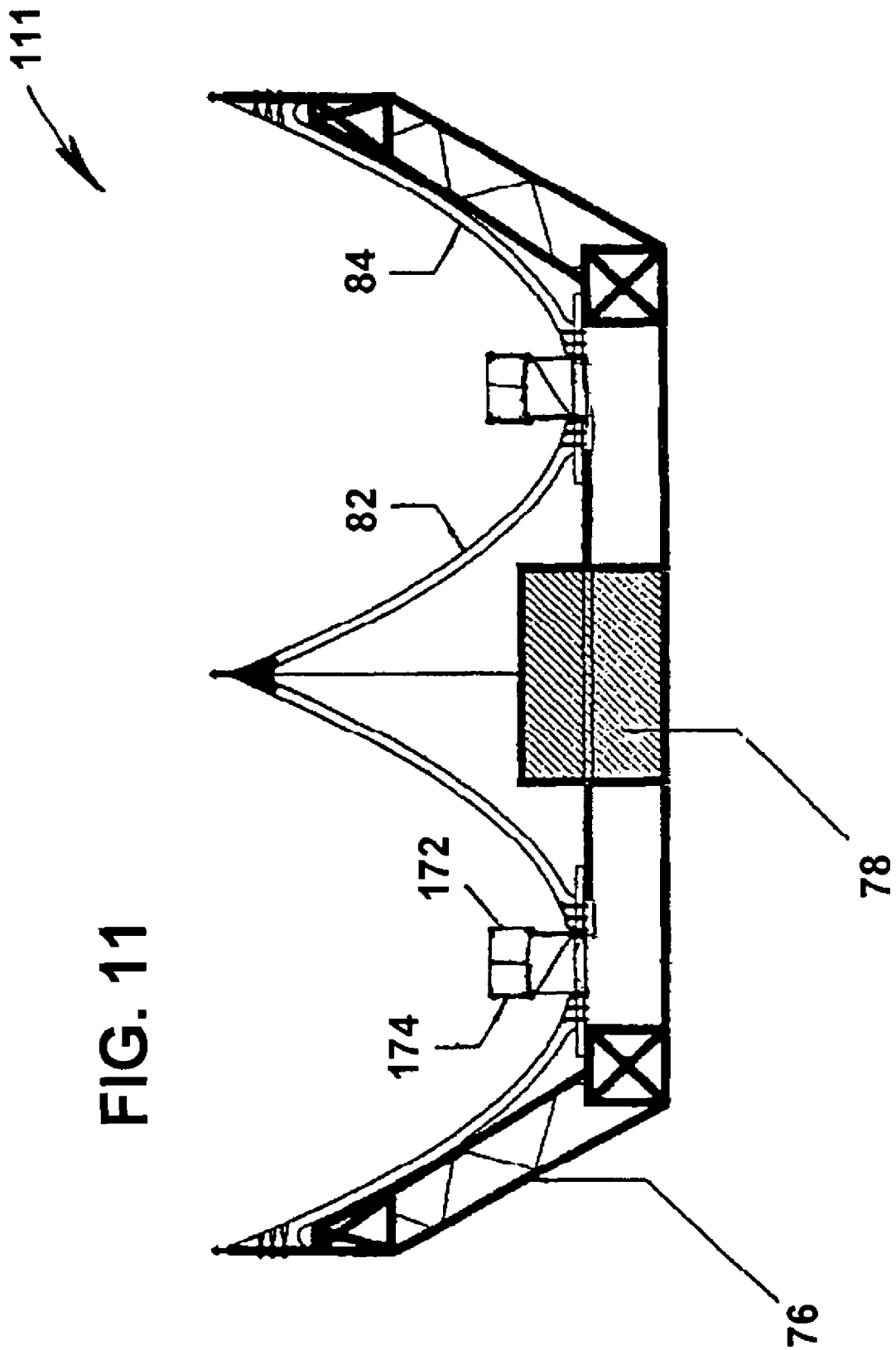
FIG. 11 is a cross sectional view of a collimator for use with optical frequency sources.
Figure 12:
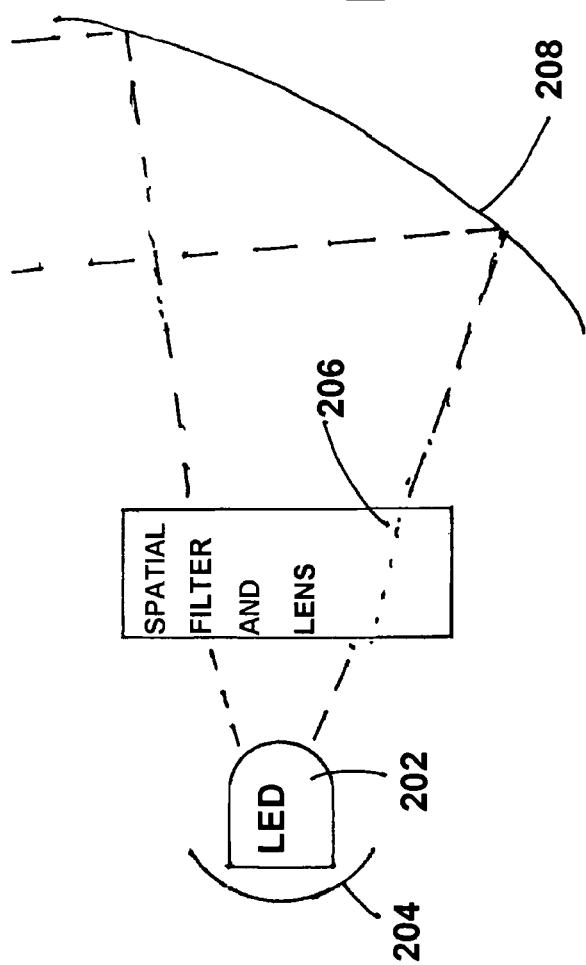
FIG. 12 is a schematic illustration of a optical source for use with the collimator of FIG. 11.
Figure 13:
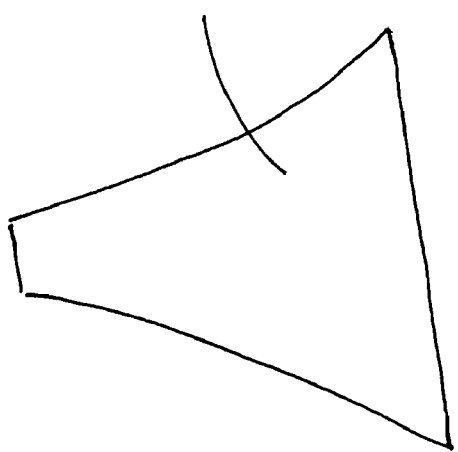
FIG. 13 illustrates the cross sectional shape of a beam of light produced for intersection with a final stage reflector.

FIGS. 11, 12 and 13 illustrate application of the principals of the invention to an optical system 111. Optical system 111 is illustrated as including both inner and outer reflectors 82, 84, set in a frame 76. Optical system 111 could readily be built with just an inner reflector 82, and it is expected that typically an inner reflector 82 is all that would be required. Inner reflector 82 is a tapering cone pointing forward along the radial axis of the optical system 111. Outer reflector 84 is in effect a partial parabolic reflector, truncated at the base. Housed within inner reflector 82 is an electronics package 78, which may include a ballast for lamps depending upon the type of illumination used. Inner and outer lamp rings 172, 174 are light emitting devices oriented, respectively, to direct light inwardly toward the inner reflector 82 or outwardly toward the outer reflector 84. The surfaces of the reflectors are preferably mirror like (i.e. polished). Spacing between light emitters is not critical since interference between the emitters is not used to achieve beam compression.

The curved array of optical frequency electro-magnetic emitters 82 does not function as a phase array as do RF emitters. Thus other means must be introduced to shape the light emitted by the light source(s) to a dispersion pattern as would be observed with radio frequency sources. Filters and lenses provide the needed shaping. FIG. 13 illustrates an LED 202 light emitter set in a parabolic reflector 204, with both LED and parabolic reflector being oriented to direct light toward a mirrored spike type final stage radiator 208 through a filter and lens system 206. Depending upon the configuration reflector 204 or filter and lens system 206 may be dispensed with, thought generally not both. It is possible that LED 202 may be encased in a lens system 206. Reflector 204, or lens and filter system 206, are configured to produce a blade of light that, if directed toward a flat surface, would illuminate a tapering trapezoidal area 210 as illustrated in FIG. 13. The base of the blade would impinge against spike 208 at its base, and the tapered end would hit the spike toward its forward, tapering end. Such light beam shaping is well known from vehicle headlamp technology, where it is conveniently obtained using Fresnel type reflectors or lenses.

The present invention provides an energy projecting and focusing system which allows inputs from a potentially large plurality of sources located at equivalent locations with partially non-destructive summing of the sources to produce a collimated energy field. Substantial gains in efficiency are achieved over prior art methods of achieving fields of comparable intensity where the radiation sources are mutually coherent.

While the invention is shown in only a few of its forms, it is not thus limited but is susceptible to various changes and modifications without departing from the spirit and scope of the invention.

What is claimed is:

1. An energy projector comprising:
a cone reflector having an axis aligned on an intended radiant axis and having a contour which defines a focal ring;
a source of electro-magnetic radiation located on the focal ring and oriented to direct radiation against the cone reflector for propagation along the intended radiant axis; and
the source of electro-magnetic radiation including an array of electro-magnetic radiation emitters where the emitters are located along the focal ring, spaced from one another for cooperative interference at operational wavelengths of the source of electro-magnetic radiation and oriented to direct radiation against the cone reflector for propagation of radiation along the intended radiant axis.

2. The energy projector of claim 1, further comprising:
the focal ring being located in a plane perpendicular to the radiant axis.

3. The energy projector of claim 2, the contour of the cone reflector being a hyperbola in any plane including the radiant axis.

4. The energy projector of claim 3, further comprising:
means for repositioning the array relative to the cone reflector parallel to the radiant axis to provide a dispersive energy field or a non-dispersive electro-magnetic energy field.

5. The energy projector of claim 1, further comprising:
the electro-magnetic radiation emitters in the array being located relative to one another to operate as an inwardly directed, curved phase array when emitting coherent radio frequency radiation to generate a dispersion pattern from interference between emitted signals.

6. The energy projector of claim 5, further comprising:
the focal ring being located in a plane perpendicular to the radiant axis.

7. The energy projector of claim 6, further comprising:
means for repositioning the array relative to the cone reflector parallel to the radiant axis to provide a dispersive energy field or a non-dispersive electro-magnetic energy field.

8. The energy projector of claim 1, further comprising:
the electro-magnetic radiation emitters being optical or higher frequency devices disposed at discrete locations long the focal ring; and
radiation filtering and focusing elements between the electro-magnetic emitters and the cone reflector reduce the forward and backward dispersion of the radiation emitted by the electro-magnetic emitters relative to the radiant axis of the cone reflector.

9. The energy projector as set forth in claim 6, further comprising:
a receiving antennae array disposed around the cone reflector.

* * * * *